United States Patent Office 3,202,545
Patented Aug. 24, 1965

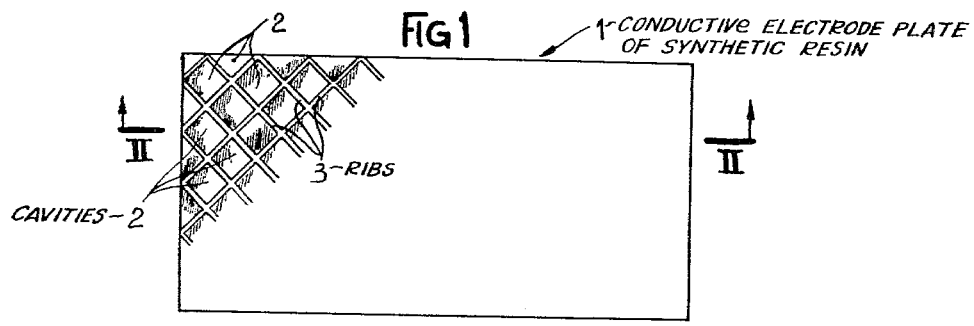
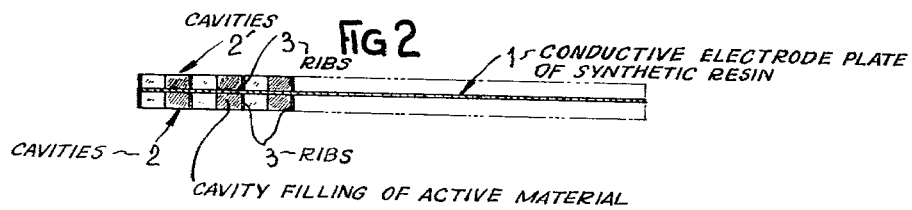
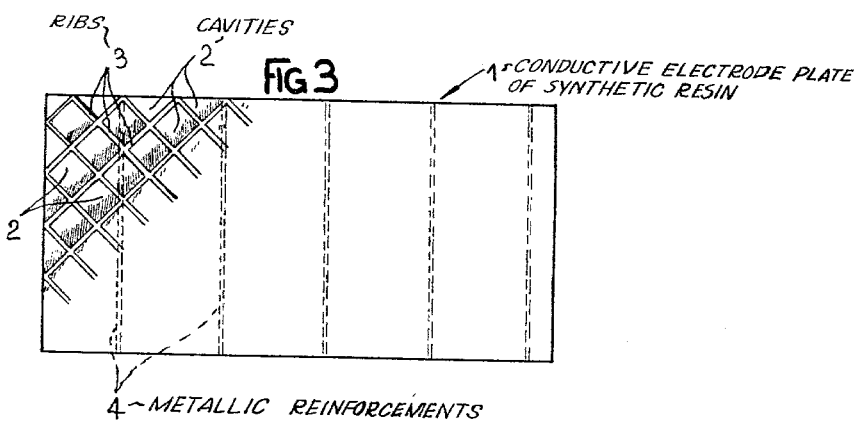
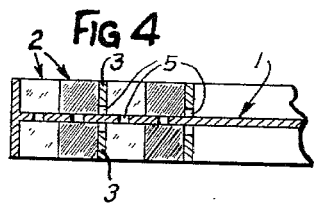

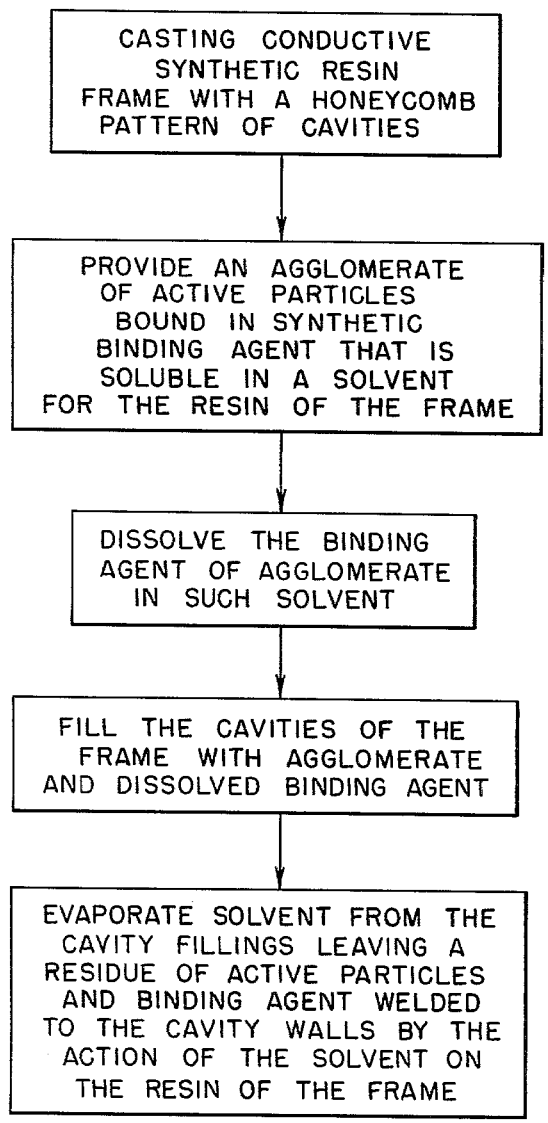

3,202,545
ELECTRODES FOR STORAGE BATTERIES, FUEL CELLS AND THE LIKE, AND METHOD OF MANUFACTURING SAME
Raymond Emeriat, Paris, France, assignor to Societe des Accumulateurs Fixes et de Traction (Société Anonyme), Romainville, Seine, France, a company of France
Filed May 15, 1961, Ser. No. 109,925
Claims priority, application France, May 16, 1960, 827,480
4 Claims. (Cl. 136—38)

The invention relates to a method of manufacturing porous electrodes for electric storage batteries, fuel cells, dry-batteries and like devices.

Porous electrodes are well known in the art, they are generally obtained by sintering or pressing metal powder. Such electrodes are hardly suitable to certain purposes, mainly when it is strictly necessary for them to be pervious to gases and impervious to liquids. It has already been proposed to manufacture electrodes of this kind from finely ground metal or graphite, with or without addition of a catalyst by agglomerating said mixture by means of a suitable binding medium. The electrode obtained then assumes the shape of a compact block.

A drawback inherent to such blocks is that they provide only a relatively small area exposed to the electrolyte action with respect to their volume and that they, moreover, are pervious to liquids.

The object of the invention is to avoid such a drawback.

The method according to the invention includes the step of applying on an electrically conductive frame of synthetic resin the active porous portion of said electrode, said portion being pervious to gases, impervious to liquids and electrically conductive and is characterized in that said frame is made of a thin plate comprising ribs on at least one of its faces, said ribs defining cavities associated according to a substantially honeycomb pattern, said cavities being filled with porous substance constituting said active portion of said electrode, said porous substance adhering to the bottom and the walls of said cavities.

According to a further feature of the invention, the active portion of the porous electrode which fills said cavities consists of pulverized coal, divided carbon, metal powder, divided conductive metallic oxide, taken separately or as a mixture of at least some of them. The particles of said powder being bound together by means of a synthetic porous resin so as to be pervious to gases and impervious to liquids.

According to still another feature of the invention, the synthetic porous substance which is used as a binding agent for the active portion of the electrode when the substance of said portion is at the pulverulent stage and which is pervious to gases and impervious to liquids, is soluble in the same solvent as said synthetic resin material constituting the electrode frame.

It will be readily understood that according to any of the steps of the method of the invention it is possible to obtain a very thin electrode comprising the adequate amount of porous substance and having the desired mechanical resistance and consequently ensuring a long lifetime as well as the specific conditions of perviousness to gases and imperviousness to liquids.

The invention includes by way of new article of manufacture an electrode obtained by the aforesaid method or means. It is also concerned with an electrode for storage batteries, dry batteries, fuel cells, and like devices constituted by an electrically conductive frame forming a support for the active porous portion of said electrode, said portion being pervious to gases and impervious to liquids characterized in that said frame is made of a thin plate comprising ribs on at least one of its faces, said ribs defining cavities filled with said porous substance constituting said active portion of said electrode, said porous substance adhering to the bottom and the walls of said cavities.

In the annexed drawing given only by way of example:

FIGURE 1 is a diagrammatic plan view of a frame plate according to the invention.

FIGURE 2 is a sectional view taken along lines II—II of FIGURE 1.

FIGURE 3 shows a frame plate provided with reinforcing elements.

FIGURE 4 is a sectional view similar to FIGURE 2 on an enlarged scale illustrating a modified detail of construction.

FIGURE 5 is a flow diagram illustrating the practice of the method of this invention.

According to the example of FIGURES 1 and 2, the electrode comprises a plate 1 the two faces of which are provided with cavities 2. Ribs 3 are bordering said cavities so as to constitute a honeycomb structure. Plate 1 is very thin and is made of synthetic resin. This resin is necessarily conductive and this is easily obtained by incorporating therein a metal or graphite powder or a mixture of both powders. Plate 1 is, for example, obtained by a casting process, the ribs 3 being formed integral with said plate. It is, of course, possible to provide ribs only on one of the faces of said plate. It is also possible to obtain said plate by a sticking process, that is by sticking or pasting the ribs on the faces of the plate.

In the cavities 2 is placed a porous substance constituting the electrode proper. This porous substance is preferably an agglomerate of metal or graphite powder, conductive metallic oxide taken separately or as a mixture of at least some of these materials.

Preferably but not necessarily, the binding agent used for agglomerating the aforesaid substance or substances comprises a hydrophobic synthetic resin dissolved in a volatile solvent. This solvent is preferably a solvent for the frame material. During the drying process the solvent is evaporated whereby numerous small openings are formed through the thickness of the binding agent. This allows the porous agglomerate to be pervious to gases and impervious to liquids. Simultaneously, this porous agglomerate gets welded to the bottom and the walls of the cavities 2. Thus, a mechanically well resisting electrode is obtained which meets the specific requirements of use.

Polystyrene made conductive by incorporation of graphite or metal powder may be used for hydrophobic synthetic substance to constitute the electrode frame. The binding agent for the agglomerate located in the cavities 2 may be polystyrene dissolved, for instance, in trichloroethylene.

Naturally, metallic structural elements may be incorporated in plate 1 as shown in FIGURE 3. These structural elements are shown at 4. Internal ducts or channels 5 (FIGURE 4) may be provided during the casting process in plate 1 to connect the different cavities 2 with one another. These channels provide aerating means or conveying means for air or gases such as oxygen, hydrogen, carbon monoxide, methane, etc.

The electrode according to the invention may be inserted in a frame made of synthetic material, such as polystyrene, the edges of said electrode being tightly stuck by means of the same solvent. Cells comprising such elements may easily be incorporated in the containers of a battery.

Electrodes according to the invention have a good mechanical resistance and are likely to be used in assemblies in which contacts with the atmosphere are provided along very large areas. Moreover, the above mentioned internal ducts in the plate even when of a very small diameter permit a flow of air or gases (oxygen, hydrogen, carbon monoxide, methane, etc.) therethrough.

Owing to their resistance, such electrodes may be set close to the periphery of a battery container instead of being placed in central position as it is the case at present with carbon rods.

A very rational disposition is thus obtained since the active area through which the oxygen contained in the atmosphere enters the electrochemical generator is substantially increased.

The invention further includes, by way of new articles of manufacture, dry batteries, fuel cells, storage batteries and like devices obtained by the above described method and including the above mentioned electrode.

The invention particularly relates to any kind of electrode that is manufactured by a casting, sticking or like process to provide a frame in which the porous portion of said electrode is retained.

It will be understood that the invention is nowise restricted to the forms of embodiment that have been given merely by way of example.

What I claim is:

1. A method of manufacturing an electrode including the steps of forming an electrically conducting supporting frame constituted by a thin rigid plate of polystyrene incorporating a conductive medium, said frame having ribs on at least one face, said ribs delimiting cavities disposed according to a substantially honeycomb pattern, providing an agglomerate of active particles bound together by polystyrene as a binding agent, dissolving the binding agent of said agglomerate in a solvent which is also a solvent for said polystyrene constituting the frame, applying said agglomerate containing the dissolved binding agent into the cavities of said frame, and evaporating the solvent of said so applied agglomerate so as to obtain in said cavities after evaporation of the solvent an active portion of residue that is pervious to gases and impervious to liquids comprising numerous small openings through its thickness and which residue adheres to the bottom and the walls of said cavities as a result of action of the solvent prior to evaporation on the synthetic material of the frame.

2. Method according to claim 1 including providing venting channels in said frame during its formation, said channels connecting the cavities of said electrode with one another.

3. Method according to claim 1 wherein trichloroethylene is used as a solvent for said binding agent.

4. An electrode prepared according to the method of claim 1.

References Cited by the Examiner
UNITED STATES PATENTS

| | | | |
|---|---|---|---|
| 393,955 | 12/88 | Woodward | 136—49 |
| 880,368 | 2/08 | Decker | 136—36 |
| 2,684,989 | 7/54 | Wilburn | 136—38 X |
| 2,811,572 | 10/57 | Fischback et al. | 136—34 |
| 2,853,536 | 9/58 | Sundberg et al. | 136—26 |
| 3,009,980 | 11/61 | Corren et al. | 136—34 |
| 3,075,033 | 1/63 | Salkind | 136—24 |
| 3,080,442 | 3/63 | Hobert | 136—86 |
| 3,097,116 | 7/63 | Moos | 136—120 |
| 3,113,048 | 12/63 | Thompson | 136—86 |

WINSTON A. DOUGLAS, *Primary Examiner.*

JOHN R. SPECK, MURRAY TILLMAN, *Examiners.*